TIME DELAY APPARATUS

Filed July 24, 1961

Inventors
JAMES W. HOEKJE
HAROLD WASHINGTON
by Silverman, Mullin & Cass
Attys.

TIME DELAY APPARATUS

Filed July 24, 1961

Inventors
JAMES W. HOEKJE
HAROLD WASHINGTON by Silverman, Mullin & Cass
Attys.

TIME DELAY APPARATUS

Filed July 24, 1961 3 Sheets-Sheet 3

Inventors
JAMES W. HOEKJE
HAROLD WASHINGTON
by Silverman, Mullin & Cass
Attys.

United States Patent Office 3,267,289
Patented August 16, 1966

3,267,289
TIME DELAY APPARATUS

Harold Washington, Chicago, and James W. Hoekje, Wheaton, Ill., assignors, by mesne assignments, to Giannini-Voltex, Whittier, Calif., a corporation of California Filed July 24, 1961, Ser. No. 126,043
3 Claims. (Cl. 307—88.5)

This invention relates generally to time delay circuits, and more particularly is concerned with an improved apparatus which provides great accuracy and flexibility in use.

The primary purpose for structures embodying the invention is to provide an output signal or potential, a predetermined time after an input signal potential has been applied to the apparatus. Such devices have special use in programming the operation of systems such as those required for launching and controlling the flight of missiles, aircraft and the like. The invention is not necessarily limited to such structures but is especially advantageous in connection therewith because of the very small size and volume occupied by apparatus constructed in accordance with the invention.

The basic structure for a time delay apparatus of the general type referred to is a time delay circuit such as, for example, including a combination of resistance and capacitance arranged to be charged by the application of input potential. When the charge on the condenser which provides the capacitance reaches some predetermined value, a semi-conductor element such as, for example, a unijunction transistor, is rendered conductive and the flow of current in the base circuit of the unijunction transistor is used to trigger another semi-conductor element. The triggering of the latter semi-conductor element causes current to flow through an output circuit such as, for example, one including switching transistors, relays or the like, which closes or opens the circuit or circuits it is desired to control.

For relatively short time delays, simple devices have been used and as an example, reference may be had to the structure disclosed and claimed in co-pending patent application Serial No. 111,081 entitled Time Delay Apparatus filed by Hoekje and Ewen and assigned to the same assignee as this application. In that co-pending application, the firing of the unijunction transistor triggered a silicon controlled rectifier which thereafter continued to conduct a current, driving the output circuit until the potential across the silicon controlled rectifier was removed as, for example, by the interruption of the input potential applied to the apparatus.

Circuits of the type described above were useful for time delays of the order of fractions of a second to several seconds. In applying circuits of this kind for use in providing delays which extend over great periods of time, such as for example, thousands of seconds, two problems arise. In the first place, the components required to achieve the delay are expensive and, in the second place, the time resulting is inaccurate and difficult of prediction.

Concerning ourselves first with the question of expense, in order to achieve time delays in a conventional R.C. circuit which will result in outputs occurring thousands or even hundreds of seconds after the input potential is applied, very substantial increase in the sizes of the condensers and resistors involved would be required. In some instances multi-vibrators and flip-flop circuits have been used in order to delay application of the signal to the R.C. circuit, but such flip-flop and multi-vibrator circuits require additional components which are also expensive.

With respect to reliability, the more complex a circuit, the more room there is for fault and error. Multiplying the errors of a plurality of components required in flip-flops and multi-vibrators, one finds considerable difficulty in achieving predicted time within a few percent of that desired. Temperature changes also will adversely affect the time delay which is required. It can be appreciated that in any important and split-second systems which must be programmed with great accuracy, simplicity and reliability are prime requisites.

The invention herein has as its principal object the provision of a time delay circuit which is flexible in that it can be used accurately to achieve time delays of the order of a fraction of a second to thousands of seconds by mere change in the values of the components.

A further object of the invention is to provide a circuit of the character described which is made up of a minimum number of parts and yet which provides great reliability and accuracy in time delay.

The above objects are more or less general in character but, it is desired to point out that certain basic features of the circuitry depend upon arrangements of parts which are believed novel in apparatus of this kind. It is not believed necessary to point out these structural features since the specification which follows will do so, but it should be borne in mind that the objects of the invention are to provide such features and the claims which are appended will reflect such desires in asserting the same as the invention sought to be covered.

In order to comply with the patent statutes relating thereto but, in addition, to enable those skilled in the art to appreciate and understand the invention, preferred embodiments of the same have been illustrated in the drawings and described in considerable detail hereinafter. A block diagram and charts of the pulses occurring throughout the various parts of the apparatus are also included. In the circuit diagrams the conventional symbols are used to represent the components and it should be appreciated that arrangements of these components and layout thereof as well as minor and specific details can be changed and varied without departing from the spirit or scope of the invention.

In the figures of the drawings, the same reference characters will be used wherever feasible to designate the same or equivalent parts in different circuits.

Basically the invention consists of a structure in which a D.C. potential is applied to the input of the apparatus and is used to drive an oscillator, the oscillations of which provide measured pulses. A frequency divider is provided, this consisting primarily of an R.C. circuit in which, instead of being charged by virtue of the application of the high potential to the R.C. circuit, said R.C. circuit is charged by the pulses produced by the oscillator. By providing a low leakage condenser which will maintain the charge applied thereto, the charge is applied little by little, so that the off time between pulses results in no increase in the potential across the condenser. In this way a very substantial length of time can be used to charge the condenser. In other words, instead of being charged normally, i.e., directly through the resistance of the circuit without interruption, the condenser is charged in small increments stretched out over a substantial period of time, the duration of which is controlled by the values of the components of the circuit. In cases where the condenser would be charged uninterruptedly the only factors which would control the rate of charge of the condenser would be the values of resistance and capacitance of the charging circuit. In the case where the charge is applied little by little, it is feasible for an R.C. circuit to be used which would normally result in a charging time that is a minute fraction of the actual time occupied in charging, through the use of the invention.

The charging of the condenser is used to cause conduction of a unijunction transistor and the flow of current in the unijunction transistor due to its conducting is used to trigger a silicon controlled rectifier whose output drives some means for operating or energizing the control circuit or circuits.

Figure 1:
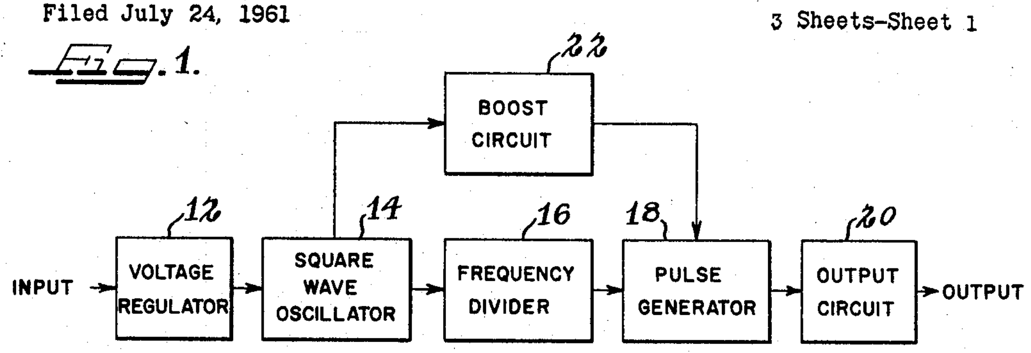
FIG. 1 is a block diagram which illustrates the principal components of the apparatus and is used in explaining the same.

Referring now specifically to the figures, attention is first invited to FIG. 1. On the left hand end of the figure, there is shown the input which consists of a D.C. potential properly applied to input terminals of the apparatus which will be described.

The first block is a voltage regulator 12 that controls the potential which is applied to the square wave oscillator which is designated 14 and is the next block. The output of the square wave oscillator is applied to the frequency divider 16 which, as stated above, comprises an R.C. circuit with additional elements, and the output from the frequency divider is a relatively large pulse which builds up as the charge on the principal condenser increases. This is applied in turn to the pulse generator 18 which consists primarily of a unijunction transistor that triggers a silicon controlled rectifier in the output circuit 20. Thereafter the output of the apparatus is used to operate a switch or to energize the circuit or circuits driven or controlled by the delay apparatus. The boost circuit 22 is a shunting path for a synchronizing pulse which renders the operation of the unijunction transistor of the pulse generator more reliable.

Figure 2:
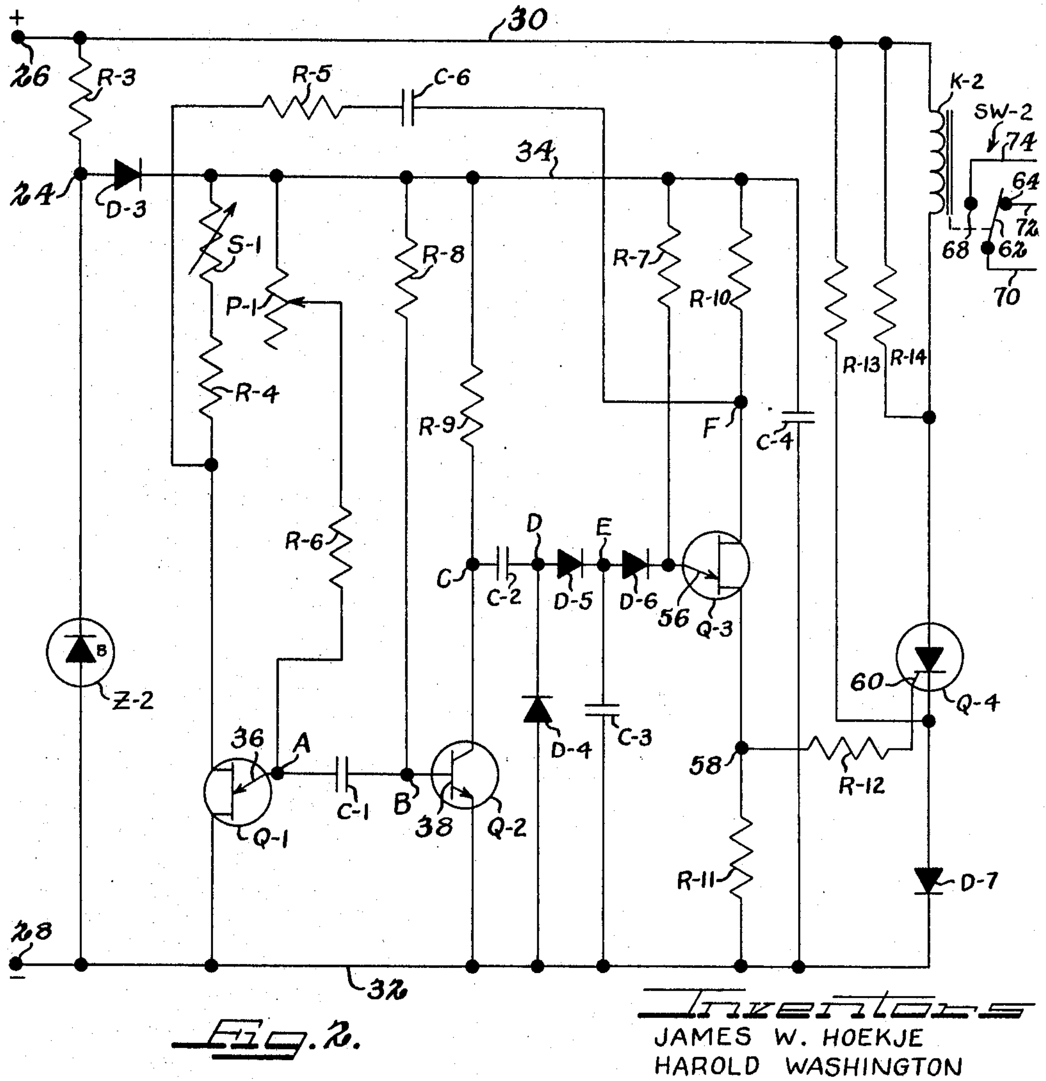
FIG. 2 is a circuit diagram of a basic structure embodying the invention, omitting certain components for clarity.

In FIG. 2, there is illustrated a basic simplified circuit embodying the invention. The input potential consists of a D.C. voltage which in the example to be described is usually of the order of 28 volts, which is applied to the two input terminals 26 and 28 with proper polarity as indicated. A zener diode Z–2 and a resistor R–3 are connected in series across the positive bus 30 and the negative bus 32. The voltage regulator 12 comprises the zener diode Z–2 and the resistor R–3 so that the potential point 24 is controlled by the value of the resistor R–3 and the characteristics of the zener diode Z–2. The potential point 24 is therefore that potential which is applied to the square wave oscillator.

The square wave oscillator 14 comprises the two transistors Q–1 and Q–2 and associated circuitry. It will be appreciated that the bus 34 is at the same potential as the point 24 and hence the capacitor C–4 which is shown at the right connects the potential point 24 through the diode D–3 to ground or to the negative bus 32. These two elements work to suppress transients passed by other prior elements so that the pure D.C. potential is applied to the unijunction transistor Q–1.

As stated above, the square wave oscillator is formed of the two transistors Q–1 and Q–2. The first transistor Q–1 is a unijunction transistor while the second, namely Q–2, is an NPN transistor. In operation, the transistor Q–2 normally is biased to a condition in which current flows in its emitter-collector circuit because of the positive bias on its base supplied by the input potential applied across the terminals 26 and 28. The gradient current between the base electrodes of the transistor Q–1 is controlled by the resistor R–4 and the sensistor S–1 which are connected in series with the base electrodes of the unijunction transistor Q–1 across the busses 32 and 34. The sensistor S–1 is a positive temperature coefficient device which is required to compensate for the silicon interbase resistance of the unijunction transistor caused by temperature changes. The emitter 36 of the unijunction transistor Q–1 is coupled to the base 38 of the transistor Q–2 by means of a coupling condenser C–1. The left-hand electrode of the condenser C–1 is connected to point A and the right-hand electrode is connected to point B. These points are indicated by reference characters because the potential existing at these points is illustrated in graphs A and B respectively in FIG. 3.

The point A is connected to the bus 34 through the resistance R–6 and the potentiometer P–1 while the point B is connected to the bus 34 through the resistance R–8.

The normal condition of the circuit is with the unijunction transistor Q–1 not conducting and the NPN transistor Q–2 conducting. Current flows in the emitter-collector circuit of the NPN transistor through the series resistor R–9 between the busses 32 and 34.

Under these conditions, current flows through the potentiometer P–1 and its associated series resistor R–6 to the capacitor C–1. The rate at which this occurs obviously is determined by the resistance values of the potentiometer P–1 and resistor R–6 as well as the capacitance of the capacitor C–1. The potential of the point A increases until the firing potential of the unijunction transistor Q–1 is reached and it conducts. At this time the condenser C–1 will discharge through the lower base electrode of the unijunction transistor to the negative bus 32. As soon as this occurs, the opposite electrode of the condenser C–1 is pulled negative, carrying the potential of the point B down and thereby cutting off the transistor Q–2.

As soon as transistor Q–2 is cut off, the condenser C–1 commences to charge through the base bias resistor R–8 until sufficient charge is accumulated to turn the transistor Q–2 on, after which it stays on and the cycle repeats, since the transistor Q–1 was turned off when the potential of the point A dropped.

The resulting oscillation is controlled by variation of the characteristics of the transistors Q–1 and Q–2 and the values of the resistors and condensers P–1, R–6, C–1, R–4, S–1 and R–9. The pulse width of the output from the oscillator 14 is controlled by C–1 and R–8. This is the "off" time. The principal frequency determining components are P–1 and R–6, with adjustment by P–1.

Figure 3:
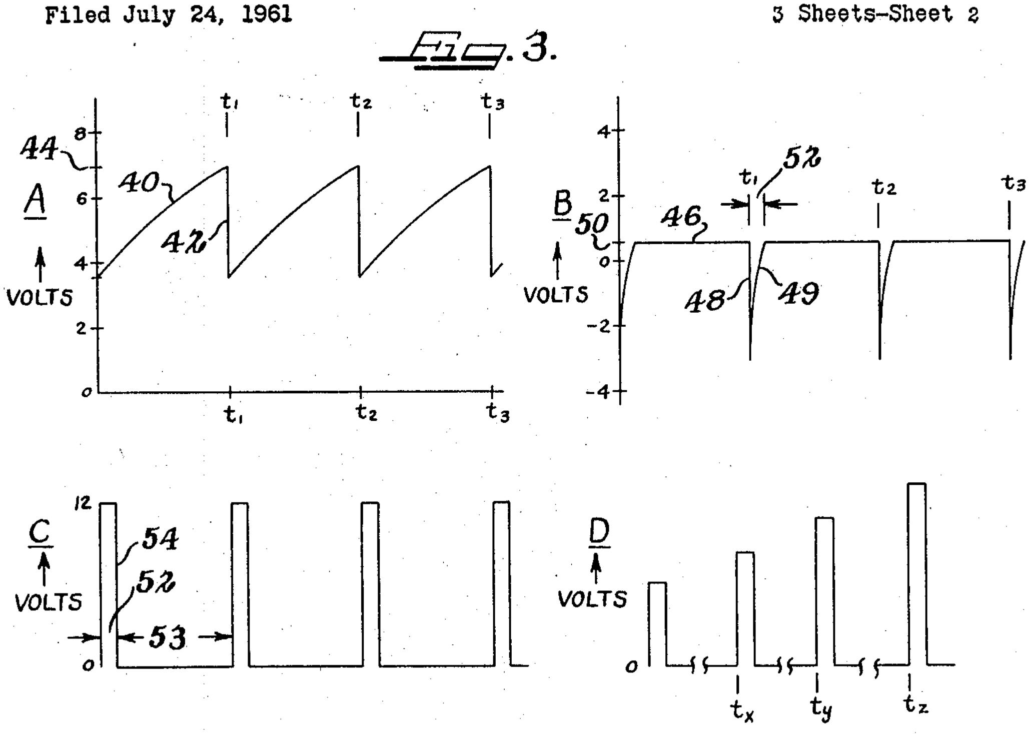
FIG. 3 is a chart consisting of four parts; namely, *a*, *b*, *c* and *d*, and representing pulses occurring at four different identified points in the circuit diagram of FIG. 2 and FIG. 5.

The phenomena described are shown in graphical form in FIG. 3 at A and B. In FIG. A, the rising line 40 represents the charging of the condenser C–1 and the sudden drop 42 represents the discharge of the condenser through the transistor Q–1. The voltage point 44 represents the firing potential of the transistor Q–1. In the graph B, the plateau 46 represents the condition during which the NPN transistor Q–2 is conducting and its base remains at a constant bias potential. The vertical drop 48 represents the discharge of the condenser C–1.

The quick rise in graph B, FIG. 3, which is designated 49, represents the charging of the condenser C–1 through the resistance R–8 and it will be seen that if the voltage 50 represents the bias at which the transistor Q–2 commences conducting, the transistor Q–2 will be off only for the time represented by 52. It will be seen how the values of C–1 and R–8 will control this time. The time 52, in seconds, is approximately equal to the product of R–8 in ohms and C–1 in farads.

So long as the transistor Q–2 is conducting, current will be flowing in its emitter-collector circuit through the resistor R–9 which during this time is the load resistor for the oscillator circuit. When the transistor Q–2 is cut off, however, current ceases flowing, and point C which is the collector of the transistor Q–2 suddenly rises in potential. It will remain at a high potential for the time that Q–2 is cut off but drops in potential when current commences to flow again. When point C is at a high potential, the current will flow through the coupling condenser C–2 and the diode D–5 into the condenser C–3 for the purpose of charging C–3 to the potential point that will fire the unijunction transistor Q–3. The pulse occurring at the point C is shown in FIG. 3 at C. It will be seen that the pulse consists of a positive going pulse of a voltage 54 that is never greater than the potential of the bus 34, and of a width 52. The so-called "off" time of the pulses 54, is represented by the time 53. During this time, no pulse is applied to condenser C–3.

The diode D–4 which is connected from the point D to the negative bus 32 keeps the pulse height from changing. This serves as the base line clamp for the pulse passing through the coupling condenser C–2. The diode D–5 is a blocking element which will keep the current from flowing out of the condenser C–3 and thereby whatever charge is applied through the diode D–5 is retained on the condenser C–3. As stated previously, this should be a very low leakage condenser.

The pulse which occurs at the point D gradually increases in amplitude each time that it occurs because there is less and less voltage required by the condenser C–3 as the charge upon it accumulates. Consequently, as shown in FIG. 3 at D, the amplitude of the pulse at point D increases. The times $t_x$, $t_y$ and $t_z$ are separated by broken lines in order to indicate that the change is very gradual and only can be detected over a long period of time.

The rate at which the condenser C–3 charges is determined by the relationship between the two condensers C–2 and C–3.

The voltage step to which condenser C–3 is charged after any number of steps is determined by the following formula:

$$\Delta e_{0(n)} = aE(1-a)^{n-1} \quad (1)$$

in which $e_0$ is the voltage to which the condenser is charged, E is the amplitude in volts of the pulse applied at the point C, C2 is the capacitance of the condenser C–2 in farads, C3 is the capacitance of the condenser C–3 in farads, $n$ is the number of steps applied and $a$ is defined as:

$$\frac{C2}{C2+C3} \quad (2)$$

It can be seen that as $n$ becomes large, $\Delta e_{0(n)}$ becomes very small, approaching the point where the reliability of the circuit may be affected, since the charging pulses have amplitudes of the order of other voltage fluctuations in the apparatus. Since the Equation 1 above defines the magnitude of the step increase, and since Equation 1 depends on the ratio (2) above, it is reasonable to assume that for a specific value of $a$ there is a specific number of pulses $n$ which makes the quantity (1) optimum. This optimum condition can be ascertained by differentiating (1) with respect to (2) and equating the resultant to zero. Performing these operations, the following expressions are obtained:

$$a = \frac{1}{n} \quad (3)$$

$$\frac{C2}{C2+C3} = \frac{1}{n} \quad (4)$$

$$C3 = C2(n-1) \quad (5)$$

Using the above equations to determine the values of the capacitors C–2 and C–3 for the maximum capacitor charge per step for a given number of pulses, a general equation can be derived to determine the total charge on a capacitor after any number of pulses. This equation is:

$$e_{0(n)} = E\left[1-\left(\frac{n-1}{n}\right)^n\right] \quad (6)$$

where $n$ is a fixed number of pulses and E is the fixed source voltage.

The above computations neglect leakage currents.

In the manner described above, the condenser C–3 will charge at a very slow rate until the firing point of the transistor Q–3 is reached at which time the condenser discharges and the cycle repeats.

This discharging is by way of diode D–6. This diode is poled to conduct in a forward direction from capacitor C–3 to the emitter electrode of transistor Q–3. Thus, this diode precludes charging of capacitor C–3 by way of biasing resistor R–7.

In order to complete the description of FIG. 2 the explanation of the remainder of the circuit will be made at this point after which reference will be made to FIG. 4 for a graphical explanation of the manner in which the condenser C–3 charges.

Assuming that the charge on the condenser C–3 has reached a potential at which point the emitter 56 of the unijunction transistor Q–3 will cause flow of current, the unijunction transistor Q–3 fires and current flows through the lower base and the resistor R–11 to the negative bus 32. From this point on the operation of the circuit is not substantially different from that of the circuit of the invention of the application mentioned above. As soon as current flows through the resistor R–11 the potential of the point 58 rises so that the voltage on the gate electrode 60 of the silicon controlled rectifier Q–4 rises and current commences to flow through the transistor Q–4 and the relay winding K–2. This moves the arm 62 by the switch SW–2 from the contact point 64 to the contact point 68 thereby opening the circuit represented by the conductors 70 and 72 and closing the circuit represented by the conductors 70 and 74.

The resistor R–12 is for the purpose of limiting the flow of current through the gate electrode 58 and the diode D–7 prior to conduction of the silicon controlled rectifier Q–4. The resistor R–13 combines with the diode D–7 to back bias the anode of the control rectifier Q–4 to prevent leakage currents of the unijunction transistor Q–3 from rendering the rectifier Q–4 conductive. The resistor R–14 is for the purpose of causing greater flow of current through the controlled rectifier Q–4. The stability, that is the characteristic of maintaining a conducting condition, of the silicon controlled rectifier Q–4 is improved with an increase in current flow through it and hence, the resistor R–14 is used.

The resistor R–10 combined with the resistor R–11 provide the bias for establishing a current gradient in the unijunction transistor Q–3. Obviously, the resistor R–11 also is influential in controlling the point at which the controlled rectifier Q–4 will conduct.

It will be clear that during conduction of transistor Q–2, the companion transistor, unijunction transistor Q–1 is OFF. Accordingly, the series resistor R–5 and capacitor C–6 which are connected between the upper base electrodes of unijunction transistors Q–1 and Q–3 carry no current.

Now, however, as unijunction transistor Q–1 conducts through sensistor S–1 and resistor R–4, the capacitor C–6 charges through resistors R–10 and R–5. This charging acts to delay conduction by transistor Q–3. This follows from the fact that charging current for capacitor C–6 flows through resistor R–10 before this current passes by way of the base electrodes of unijunction transistor Q–3 to trigger diode Q–4.

Thus, on a last oscillatory cycle before Q–3 conducts, the voltage on capacitor C–3 arrives at a threshold for conduction by this unijunction transistor Q–3. At this time the upper base electrode of transistor Q–1 is at a low potential and current flows by way of resistor R–10 to charge capacitor C–6 as on previous cycles of conduction by Q–1.

As capacitor C–3 receives a last, threshold achieving increment of charge however, without capacitor C–6, a tendency would exist for transistor Q–3 to begin conduction and immediately stop as charge drains from capacitor C–3. With current flowing to capacitor C–6, in accordance with the invention, when Q–3 first begins to conduct, the potential of point F is already dropped by charging of capacitor C–6. This holds transistor Q–3 solidly in a conducting condition to overcome slight discharge by the capacitor C–3.

For analyzing this phenomenon, it is well to consider the momentary conduction conditions of the several transistors just at conduction by transistor Q–3. Transistor Q–2 must turn off to give an additional increment of charge to capacitor C–2 through resistor R–9. This means that transistor Q–1 has begun conduction and the upper conduction electrode of this latter transistor has dropped in potential. Accordingly charging of capacitor C–6 takes place through resistor R–10 to lower the potential of the upper electrode of transistor Q–3 and thus hold this unijunction transistor locked in a conducting condition.

Figure 4:
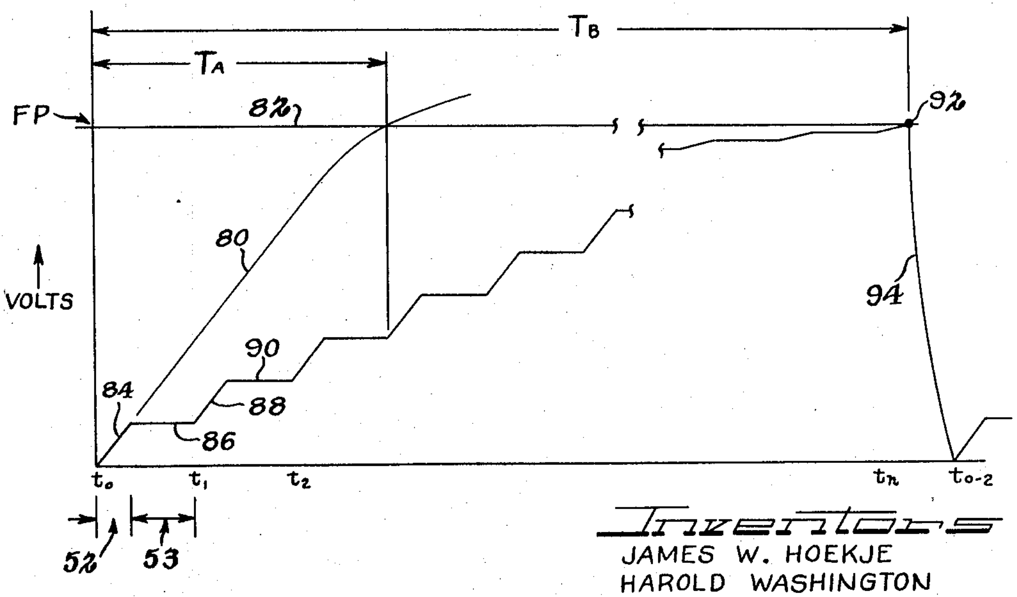
FIG. 4 is a chart illustrating the potential existing at an important point of the circuit, the same being more or less diagrammatic in nature.

Considering now FIG. 4, the graph represented is that of the potential at the point E and hence is the charge curve of the condenser C–3. Time is shown along the horizontal axis and voltage on the vertical axis. The points $t_1$, $t_2$ and so forth represent complete cycles of oscillation of the oscillator 14. These divisions are increasingly smaller and it will be seen that the last point is marked $t_n$ since at the next rise in voltage the firing point of the transistor Q–3 is reached. This firing point is marked FP on the drawing.

If there were no arrangement for gradually charging the condenser C–3, but instead it were permitted charge along its uninterrupted charging characteristic, the time which would elapse between $t_0$ and the instant that the unijunction transistor Q–3 conducts would be represented by the intersection of the line 80 with the line 82. 80 is the characteristic of charge of the condenser C–3 through the resistance R–9 and 82 represents the voltage of the firing point of the unijunction transistor Q–3. The total elapsed time is shown as $T_A$.

Instead of this, however, each cycle of the square wave oscillator 14 consists of two parts, one of which is a narrow positive-going voltage pulse (point C) and one of which is an absence of voltage. The time duration of the pulse is measured at 52, with the "off" time at 53. The condenser C–3 will charge only during the "on" time 52. Assuming that the condenser is a perfect non-leakage condenser, the charge will remain until the next cycle begins. The charge on the condenser C–3 will therefore follow a short rise 84 and then will remain at a plateau 86, will have another rise 88 as soon as the second cycle commences at $t_1$ and remain at the plateau 90 until the next cycle commences at $t_2$ and so forth. In this manner, the charge on the condenser is built up until finally during the cycle which commences at $t_n$ the firing point represented by the voltage line 82 is finally reached as shown at 92 and now the unijunction transistor Q–3 fires and the condenser C–3 discharges through the resistor R–11 along the line 94 until the next series of pulses start, commencing at $t_{0-2}$. The total time which has elapsed between $t_0$ and the firing of the unijunction transistor is represented by the distance $T_B$. This is a very substantial amount with time greater than the time $T_A$. In FIG. 4 the dimensions are exaggerated with the number of pulses compressed in order to illustrate the manner in which the circuit operates. The increase in time is equal to $T_B$ minus $T_A$.

Attention is now invited to the boost circuit 22 which is represented by a resistor R–5 and a condenser C–6 connected from the upper base of the transistor Q–2 to the upper base of the unijunction transistor Q–3. A characteristic of the unijunction transistor is that it is sometimes difficult to carry the emitter potential from the cutoff region over the peak point into the negative resistance region. It has been found that a continuous negative pulse applied to the upper base will effectively increase the reliability and guarantee the firing of the unijunction transistor by cutting down on the total amount of current needed. This is supplied therefore through the boost circuit with the resistor R–5 determining the amplitude of the boost pulse and the condenser C–6 coupling this to the upper base of the unijunction transistor Q–3. The boost pulse is applied at the point F in FIG. 2.

The diode D–6 is for the purpose of preventing the leakage current of the unijunction transistor Q–3 charging the condenser C–3. This is a feature which additionally provides greater accuracy to the predetermined time delay.

Figure 5:
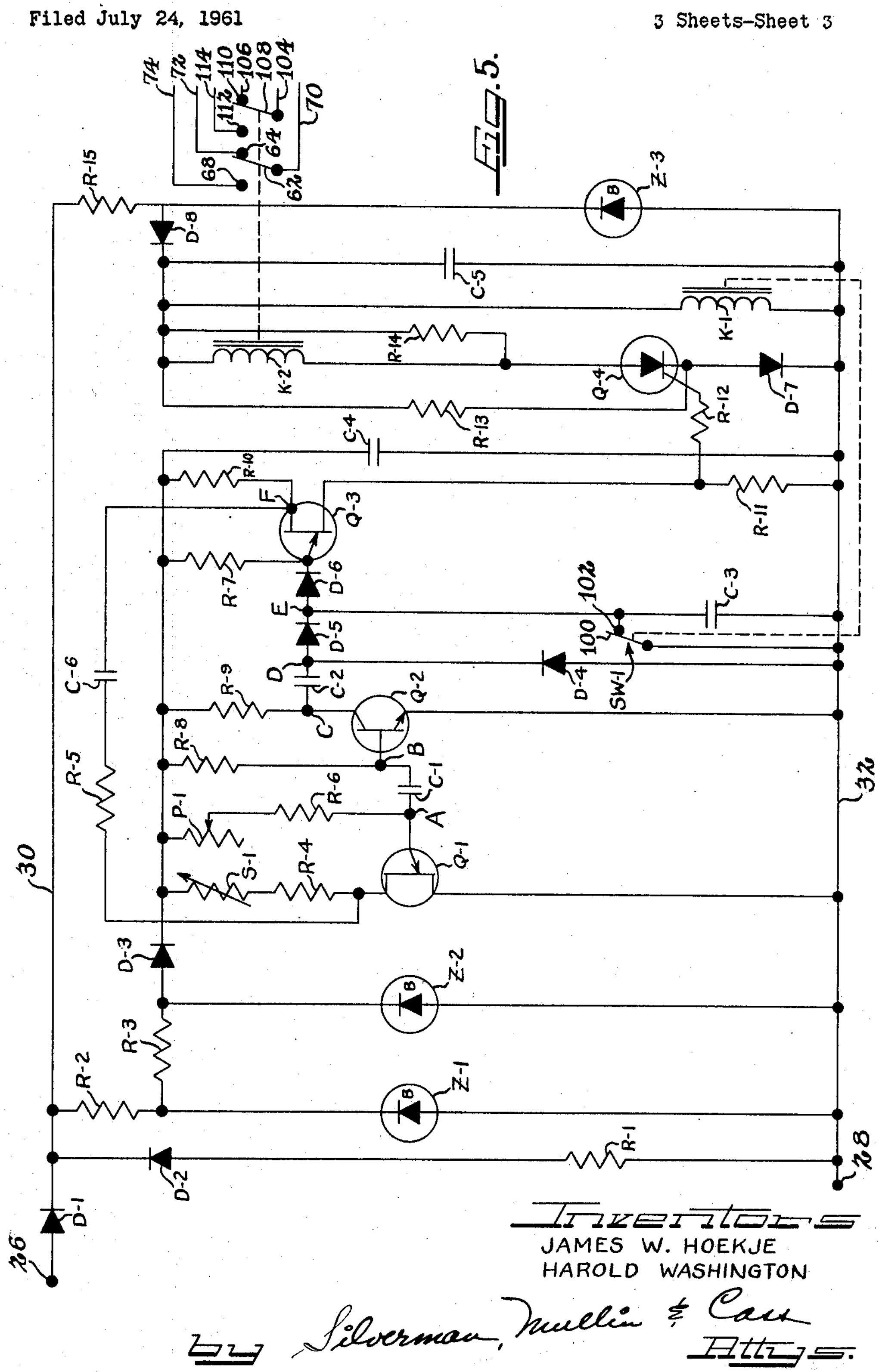
FIG. 5 is a circuit diagram of a time delay apparatus of practical structure embodying the invention.

FIG. 5 is a detailed circuit diagram of a practical commercial device embodying the invention the nature and operation of which are substantially the same as that of FIG. 2. The several additional elements shown are for the most part for protection of the components. The same characters of reference designate the identical parts which render the circuit diagram easy to follow in comparing the same with that of FIG. 2.

The diode D–1 is normally included in most circuits of this kind and is actually an economical burn-out diode so that high surges of current first destroy the diode and protect the expensive components of the circuit. The diode W–2 which is in series with the diode D–1 across the busses 30 and 32 is for the suppression of transients. The zener diode Z–1 has the dropping resistor R–2 in series therewith and it is a high power diode to protect the zener diode Z–2 from high power transients. These will be by-passed to the negative buss 32.

It will be noted that there is a switch SW–1 which shunts the principal condenser C–3 when it is closed. The switch arm 100 when engaged with the contact 102 will immediately discharge the condenser C–3 regardless of the potential to which it has been charged. This switch SW–1 is normally closed when there is no potential applied across the terminals 26 and 28. As soon as current does flow, however, due to the application of the potential across the points 26 and 28, current will flow through the relay coil K–1 limited only by the value of the resistor R–15, and the switch SW–1 will open. The moment that the current is interrupted for any reason, the switch will close thereby completely discharging the condenser C–3 so that there will be no residual charge remaining and thereby enable a very accurate charge to be placed upon the condenser under the control of the oscillator.

The only other elements which are shown in FIG. 5 and not in FIG. 2 are the diode D–8 and the condenser C–5 which are for protecting the apparatus against transients and serve the same purpose as the diode D–3 and condenser C–4. The zener diode Z–3 is another protective device for taking care of transients. Resistor R–15 serves as its bias.

It will be noted that the switch SW–2 is shown with additional circuitry controlled by the relay coil K–2. A normally closed circuit represented by the conductors 104 and 106 is opened by energization of the relay winding K–2 through movement of the arm 108 off the contact 110 to the contact 112 thereby closing the otherwise open circuit represented by the conductors 104 and 114.

In other respects the circuit of FIG. 5 is identical to that of FIG. 2 and operates in the same manner.

As in the case of the structure of the application hereinabove referred to, the output circuit need not be formed of relays which require energization and mechanical movement of contacts. It is feasible to use switching transistors for the same purpose, but where substantial long periods of time are involved, there is no need for the added complexity of transistorized circuits required to handle currents which can be handled by relays.

It is believed that the invention has been fully explained such as to enable those skilled in this art to understand and practice the same, but for purposes of additional clarity, the commercial version of FIG. 5 will be described in detail hereinafter. The following components were used in the construction of this circuit:

| Diodes: | Type |
|---|---|
| D–1 | IN538 |
| D–2 | IN677 |
| D–3 | IN482 |
| D–4 | IN482 |
| D–5 | RD2300 |
| D–6 | RD1359 |
| D–7 | SG22 |
| D–8 | IN678 |

| Resistors: | Ohms |
|---|---|
| R–1 | 47 |
| R–2 | 300 |
| R–3 | 150 |
| R–4 | 200 |
| R–5 | 1,000 |
| R–6 | 5,100 |
| R–8 | 3,000 |
| R–9 | 3,600 |
| R–10 | 820 |
| R–11 | 220 |
| R–12 | 220 |
| R–13 | 10,000 |
| R–14 | 1,000 |
| R–15 | 75 |

| Capacitors: | Microfarads |
|---|---|
| C–1 | .22 |
| C–2 | .000820 |
| C–3 | 3 |
| C–4 | 100 |
| C–5 | 100 |
| C–6 | .1 |

| Zener diodes: | |
|---|---|
| Z–1 | SU2020 |
| Z–2 | LPZ12A |
| Z–3 | SU2299 |

| | Ohms |
|---|---|
| Sensistor: S–1, TI–TM 1/4 | 470 |
| Potentiometer: P–1 | 100,000 |

| Transistors: | |
|---|---|
| Q–1 | 2N490 |
| Q–2 | 2N552 |
| Q–3 | 2N492 |
| Q–4 | 2N1595 |

The circuit constants above named are typical. The relay solenoid coils were chosen at 600 ohms. All of the components are commercially available in the ranges required, and at ratings suitable for use in the circuits.

The above circuit enabled a time delay of from 4 to 40 seconds to be achieved primarily through variation of the potentiometer P–1. The only values which were adjusted in production were values of resistors R–4, R–6 and R–10 to permit sufficient range and variation of the time. The accuracy of the above circuit was less than 3 percent in variations of temperature from −65 degrees Fahrenheit to +200 degrees Fahrenheit and had substantially better accuracy over smaller ranges of temperature change.

Where the requirements for protection of components are not as stringent as they are, for example, in military applications, the device may be substantially simplified. Obviously, any variations and changes may be made without departing from the spirit or the scope of the invention as defined in the appending claims.

What it is desired to secure by Letters Patent of the United States is:

1. A time delay apparatus for providing an output a predetermined time after the application of a continuous input signal thereto for continuously providing said output so long as the input signal remains comprising, a pair of input terminals for receiving said input signal, voltage regulator means connected to said input terminals, a measured pulse oscillator connected in circuit with said terminals and with said voltage regulator, said oscillator being connected and arranged for operating continuously so long as there is an input connected to said input terminals, a frequency divider connected to said voltage regulator and having a charging capacitor therein, the charge of said capacitor being controlled by the output of said measured pulse oscillator whereby said capacitor charges in increments the duration and frequency of which are controlled by said oscillator, a pulse generator normally inoperative and adapted to be triggered to operative condition when the charge of said capacitor has reached a predetermined value, an output circuit driven by the said pulse generator and being adapted to provide the above mentioned continuous output, wherein said normally inoperative generator comprises a unijunction transistor biased normally to non-conduction and having an emitter electrode connected with said frequency divider to be affected by the charge on said capacitor in which there is a boost circuit connected between said measured pulse oscillator and pulse generator providing a continuous negative potential pulse to said unijunction transistor to reduce the amount of current required to render said unijunction transistor conductive.

2. A time delay circuit of the character described adapted to be energized by a D.C. source and which comprises: a D.C. voltage regulator; a measured pulse oscillator which comprises a unijunction transistor having its bases connected across said regulator and biased normally to have its emitter non-conductive, a variable resistance charging circuit coupled to said emitter and including a coupling capacitor, a two junction transistor having its emitter-collector connected across said regulator and its base biased to provide conduction in said emitter collector circuit normally, the coupling capacitor being connected between the emitter of said unijunction transistor and the base of said two junction transistor; a storage capacitor connected to said emitter-collector circuit and across said regulator whereby the storage capacitor will charge only so long as the two junction transistor is non-conducting; a second unijunction transistor having its bases connected across said regulator and biased so that its emitter normally is non-conductive, said last mentioned emitter being connected to said storage capacitor; and an output circuit comprising a controlled rectifier adapted to be connected to said D.C. source and normally non-conductive but having a gate electrode connected to a base of said second unijunction transistor to be rendered conductive when said second unijunction transistor is rendered conductive.

3. A time delay apparatus for continuously providing an output a predetermined time after the application of a continuous input signal thereto during the continuance of the application of said input signal which comprises, a pair of input terminals for receiving said input signal, voltage regulator means connected to the input terminals of said pair, a measured pulse oscillator connected with said input terminals and with said voltage regulator for continuous operation during the receiving of said input signal at the terminals of said pair, a frequency divider connected to said regulator, said divider comprising a charging capacitor, connected for receiving charging pulses from said measured pulse oscillator whereby said capacitor is charged in increments of a frequency and duration controlled by said oscillator, a pulse oscillator whereby said capacitor is charged in increments of a frequency and duration controlled by said oscillator, a pulse generator normally operative and arranged in triggered relation with said capacitor, said generator comprising a first unijunction transistor having an emitter electrode and first and second base electrodes for conducting current therethrough, resistor means for connecting said first base electrode in circuit with the first input terminal of said pair, means connecting said second base electrode in circuit with the second input terminal of said pair, resistor means connecting said emitter electrode with the first input terminal of said pair, and means connecting said emitter electrode in circuit with said capacitor, wherein said oscillator comprises a second unijunction transistor having first and second base electrodes connected across the input terminals of said pair and capacitive feed back means connected in circuit with said first unijunction transistor, first base electrode and a first base electrode of said second unijunction transistor.

References Cited by the Examiner

UNITED STATES PATENTS

| | | | |
|---|---|---|---|
| 2,915,632 | 12/1959 | Moore | 317—142 |
| 2,968,770 | 1/1961 | Sylvan | 317—148.52 |
| 3,111,591 | 11/1963 | Conron et al. | 307—885 |

OTHER REFERENCES

Gutzwiller: "Phase-Controlling Kilowatts With Silicon Controlled Semiconductors," by G. E. Com. Semiconductor Products Dept. entitled: The Silicon Controlled Rectifier.

ARTHUR GAUSS, *Primary Examiner.*

GEORGE N. WESTBY, *Examiner.*

B. P. DAVIS, *Assistant Examiner.*